United States Patent Office 3,454,245
Patented July 8, 1969

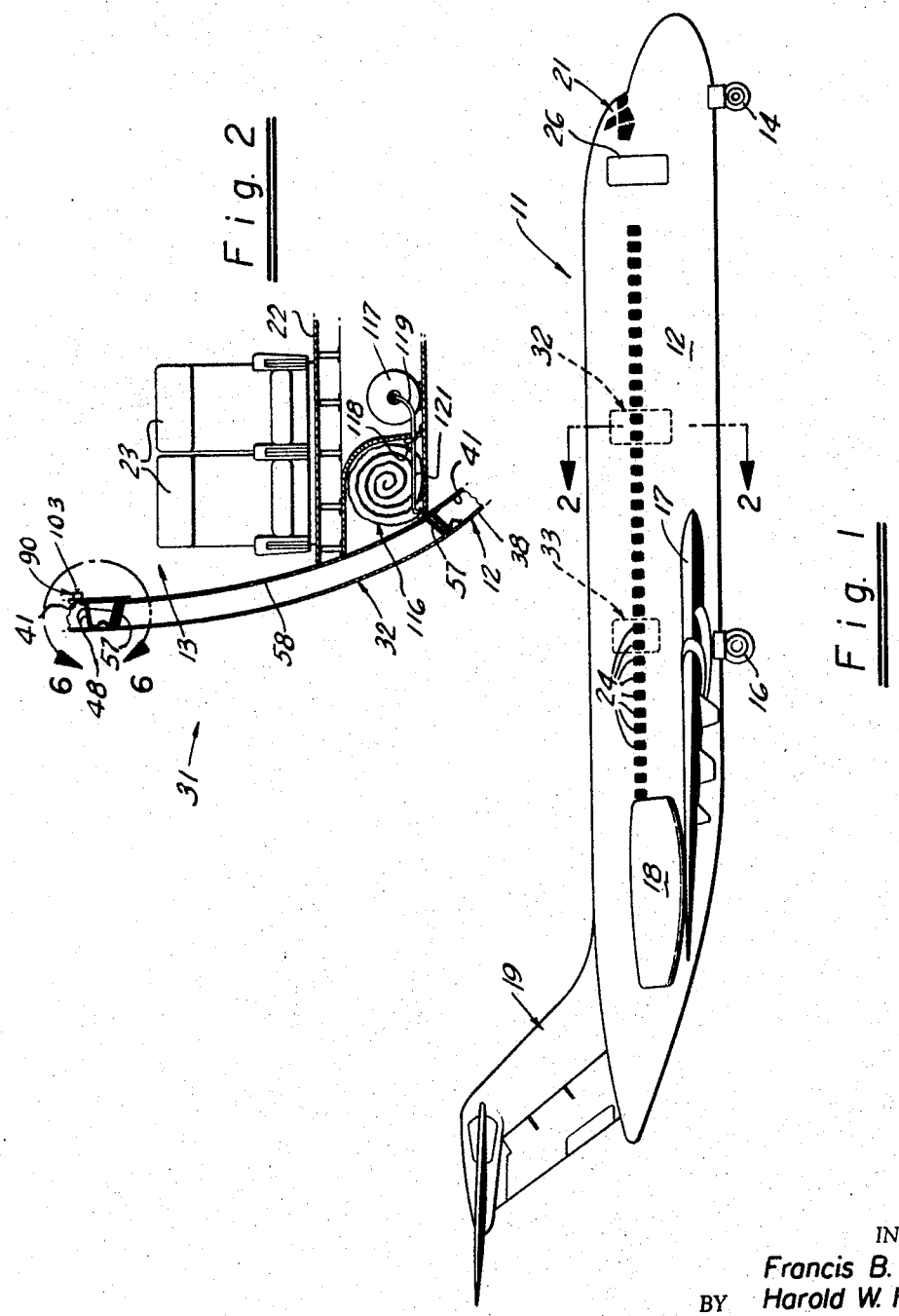

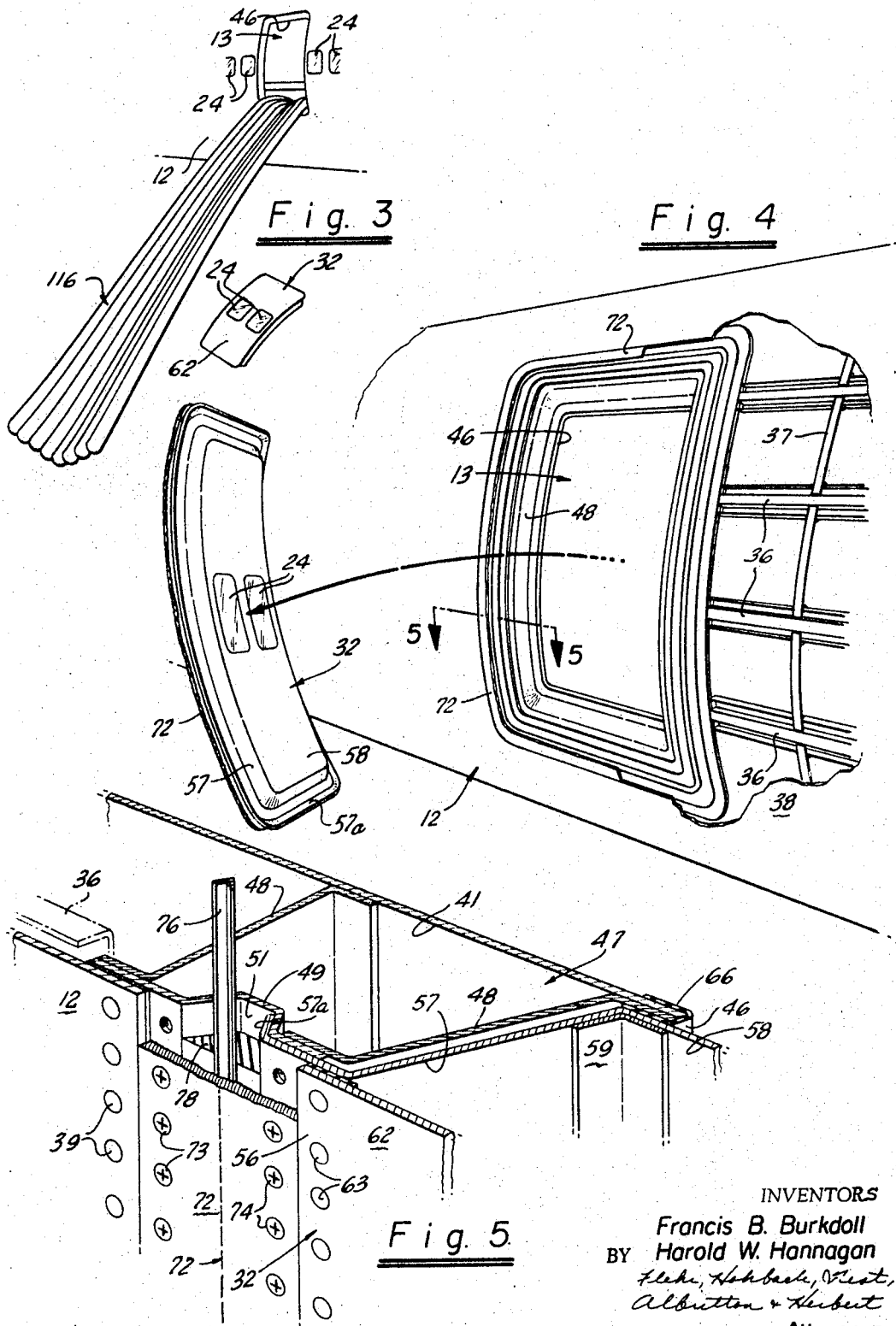

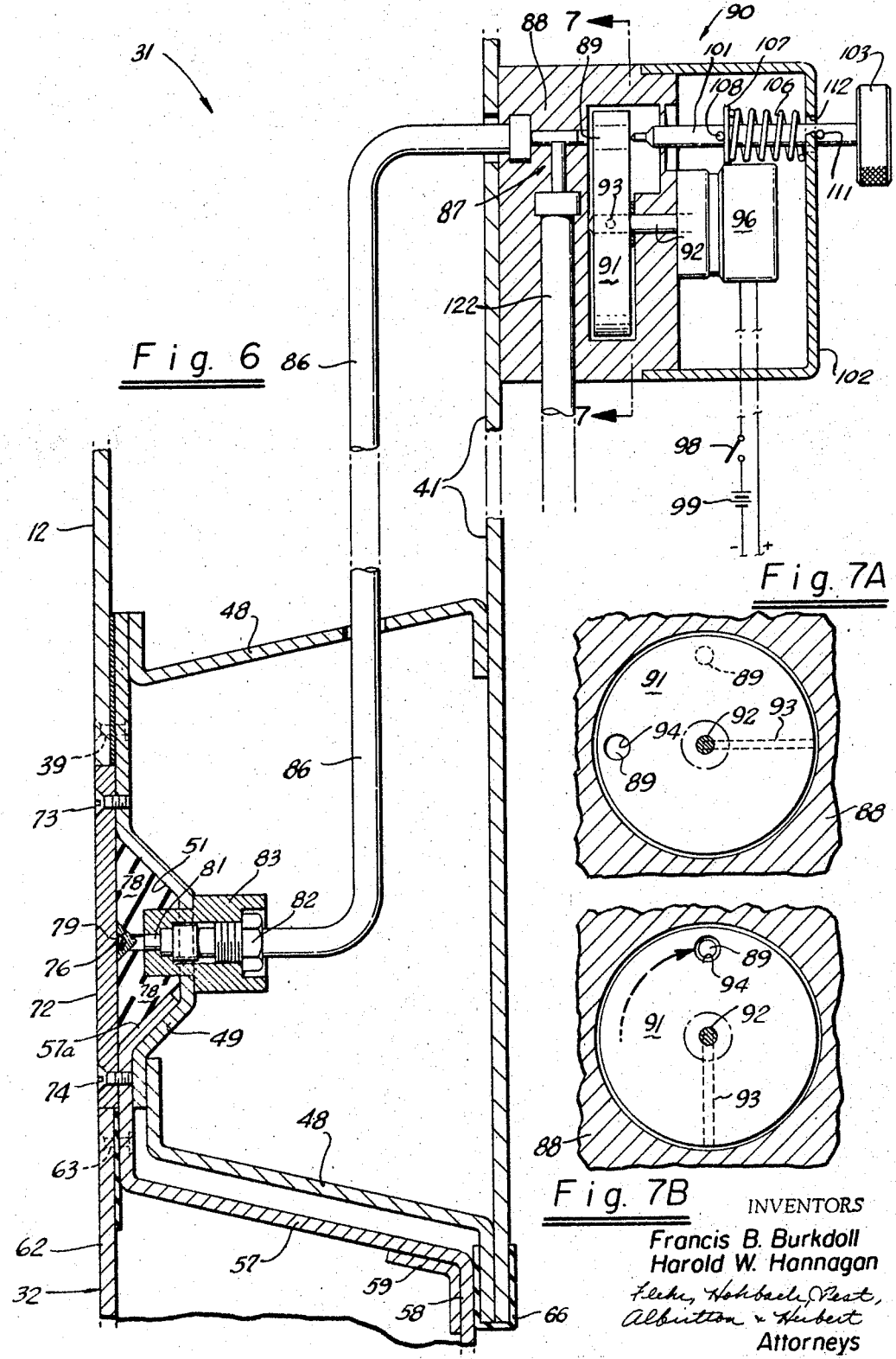

3,454,245
EMERGENCY EGRESS SYSTEM FOR VEHICLE
Francis B. Burkdoll, Fairfield, and Harold W. Hannagan, Napa, Calif., assignors to Explosive Technology, Inc., Fairfield, Calif., a corporation of California
Filed Mar. 8, 1967, Ser. No. 621,496
Int. Cl. B64d 9/00; B64c 1/22
U.S. Cl. 244—137                                                      10 Claims

ABSTRACT OF THE DISCLOSURE

Emergency egress system for vehicle having a structure enclosing space to be occupied by a human in which a linear explosive charge is carried by the wall and circumscribes an area of the wall so that when it is detonated the wall is cut and the circumscribed area of the wall is propelled outwardly to provide an emergency escape opening in the wall.

BACKGROUND OF THE INVENTION

In the operation of aircraft and in the operation of space vehicles there often arises an occasion which necessitates the need for emergency openings in such vehicles to permit the human occupants therein to escape. Escape openings provided up to the present time have been found to be inadequate for a number of reasons, the principal of which is that they require too much time to open the same and, therefore, often prevent the occupants of the vehicle from escaping before injury or death occurs.

SUMMARY OF THE INVENTION

The emergency egress system is for use with a vehicle of the type having a wall-like structure which encloses the space to be occupied by humans. A linear explosive charge is mounted on the wall-like structure and circumscribes an area of the wall-like structure. Means is also mounted on the wall-like structure for detonating the linear explosive charge. The linear explosive charge is disposed so that when it is detonated, the wall-like structure is cut and the circumscribed area of the wall-like structure is propelled outwardly so that an emergency escape opening is formed in the wall-like structure to permit humans to escape from the space enclosed by the wall-like structure.

In general, it is an object of the present invention to provide an emergency egress system for a vehicle which can be rapidly operated to provide an emergency egress.

Another object of the invention is to provide a system of the above character in which the integrity of the vehicle is retained.

Another object of the invention is to provide a system of the above character in which the emergency egress can be closed after the emergency has passed.

Another object of the invention is to provide a system of the above character which is particularly adapted for use on aircraft and space vehicles.

Another object of the invention is to provide a system of the above character which can be readily operated.

Another object of the invention is to provide a system of the above character which is relatively inexpensive and can be readily installed.

Another object of the invention is to provide a system of the above character which can be readily controlled.

Additional objects and features of the invention will appear from the following description in which the preferred embodiments are set forth in conjunction with the accompanying drawings.

BRIEF DESCRIPTION OF THE DRAWINGS

FIGURE 1 is a side elevational view of a vehicle having an emergency egress system incorporating the present invention.

FIGURE 2 is a cross sectional view taken along the line 2—2 of FIGURE 1.

FIGURE 3 is a partial perspective view showing the operation of the emergency egress system for the vehicle.

FIGURE 4 is an exploded view showing the construction of the doors and doorway of the emergency egress system.

FIGURE 5 is a cross sectional view taken along the line 5—5 of FIGURE 4.

FIGURE 6 is an enlarged cross sectional view taken along the line 6—6 of FIGURE 2.

FIGURES 7A and 7B are cross sectional views taken along the line 7—7 of FIGURE 6.

As shown in FIGURE 1, the emergency egress system is incorporated in a vehicle 11 which is a jet aircraft of a conventional type. Such a vehicle is provided with a wall-like structure in the form of a fuselage 12 which encloses a space 13 which is adapted to be occupied by humans. The vehicle is provided with front and rear landing wheels 14 and 16. The aircraft is also provided with a pair of wings 17 which are mounted on the fuselage 12 and extend outwardly and rearwardly from the fuselage. The motive means for driving the vehicle consists of a pair of jet engines 18 mounted on opposite sides of the fuselage to the rear of the wings 17. The aircraft is also provided with a conventional tail structure 19. The aircraft is also provided with a cockpit 21 at the front of the aircraft.

The passenger space or interior 13 is provided with a deck or floor 22 upon which are mounted a plurality of seats 23 which are spaced apart from the front to the rear of the passenger space 13. The fuselage 12 is provided with a plurality of windows 24 which extend the length of the aircraft and are disposed adjacent the seats 23 so that the passengers can see outside of the space 13. The aircraft is also provided with a conventional door 26 which is utilized for ingress and egress for the space 13. It should be appreciated that larger aircraft have a number of such conventional doors in each side of the aircraft which can be utilized for this purpose.

The emergency egress system 31 is incorporated in the vehicle 11 and consists of a pair of emergency egresses 32 and 33 provided on each side of the fuselage 12 of the vehicle 11. Thus, as shown, the emergency egress 32 is provided between the wings 17 and the conventional front door 26 whereas the egresses 33 are provided over the wings 17.

The fuselage 12 of the aircraft is constructed in a conventional manner and is provided with horizontal stringers 36 which are carried by circumferential frame members or ribs 37. An outer wall which is conventionally called a skin 38 is secured to the stringers 36 and the frame members 37 by suitable means such as rivets 39. Inner paneling of a conventional type is also provided which serves as a part of the fuselage and includes inner wall panels 41 which are secured to the stringers 36 and the ribs 37 in a conventional manner.

The emergency egresses or openings 32 and 33 formed in the fuselage are generally very similar. Thus, for each, an opening 46 is formed in the fuselage of the aircraft which is framed and reinforced by a door frame 47. The door frame 47 includes spaced generally parallel vertical and horizontal frame members 48 which are secured to the fuselage 12 by the rivets 39 to circumscribe the rectangular opening 46 as shown in FIGURE 4. In addition, the door frame 47 includes additional vertical and horizontal frame members 49 which are interposed between the outer skin 38 and the frame members 48 and are held in a position which is generally in the same plane as the skin 38 but spaced rearwardly from the skin 38 a distance which is substantially equal to the thickness of the skin 38. The frame members 49 are provided with a generally V-shaped trough or recess 51 which circumscribes the opening 46 to define an area which is substantially co-extensive with the opening 46.

A door 56 is mounted in the opening 46 and consists of generally L-shaped horizontal and vertical frame members 57 which are secured together in a conventional manner such as by rivets (not shown) to provide a generally rectangular structure which will fit within the opening 46. An inner panel 58 is secured to the frame members 57 by the use of an angle bracket 59. An outer skin or wall panel 62 is secured to the frame members 57 by rivets 63. Each of the doors 56 is provided with windows 24 of the same type as are utilized in the fuselage 12 of the aircraft and are constructed in a similar manner.

The frame members 57 are provided with portions 57a which extend over the frame members 49 which form part of the frame assembly 47 and extend into the trough or recess 51 and serve to position the door 56 within the door frame 47. The inner panel 58 engages a resilient bumper 66 mounted on the interior wall panels 41 of the fuselage.

Means is provided for securing the door 56 within the door frame 47 and consists of plate-like means in the form of structural continuity plates 72. The structural continuity plates 72 serve to retain the door 56 in the opening 46 of the fuselage under all normal conditions. Thus, as shown, the structural continuity plates 72 are secured to the frame members 49 which form a part of the fuselage 12 by screws 73 and are secured to the frame members 57 which form a part of the door 56 by screws 74. As will be noted particularly from FIGURE 5 showing the construction of the fuselage, the fuselage 12, the door 56 and the mounting of the structural continuity plate 72 is such that a substantially flush continuous outer surface is presented so that the fuselage 12 has an uninterrupted appearance and does not impede the travel of the aircraft through the air.

Means is provided for cutting the plates 72 and for propelling the door 56 outwardly in case of emergency and consists of a linear explosive charge 76 which is disposed in the recess 51 and circumscribes the opening 46. The linear shaped charge 76 is of a conventional type. For example, it can be the type marketed under the trademark Jetcord of Explosive Technology, Inc., of Fairfield, Calif. Such a linear shaped explosive charge consists of a shaped metal member formed of a suitable material such as lead which is substantially V-shaped or chevron shaped in cross section to concentrate the explosive effects of the explosive core contained therein. The explosive charge can be of any suitable material such as RDX, PETN, TNT, or any powdered explosive. The linear shaped explosive charge 76 is positioned immediately adjacent the structural continuity plate intermediate the side edges of the same so that the open side of the V or chevron faces the plates 72 and is in alignment with the door separation line 77 along which the cut is to be made.

Means is provided for retaining the linear shaped explosive charge 76 in contact with the door separation plates 72 and consists of a resilient member 78 which is formed so that it fits snugly within the trough or recess 51. The member 78 can be formed of any suitable resilient material such as rubber. It is also provided with a recess 79 which receives the linear shaped explosive charge 76. The member 78 substantially fills the space provided in the trough 51 behind the structural continuity plates 72, and serves to absorb and attenuate the shock from the explosion in the undesired direction.

Means is provided for initiating or detonating the linear shaped explosive charge 76 and consists of a detonator 81 of a conventional construction which is mounted on a fitting 82 threaded into a detonator housing 83. The detonator housing 83 is mounted on the frame member 49. The detonator 81 carried by the fitting 82 is connected to a shielded detonating cord 86 of a conventional construction.

Means is provided for detonating the detonator cord 86. The detonator cord 86 is connected into a T fitting 87. The T fitting 87 is mounted in a block 88. The block 88 is mounted on the inner wall panel 81.

A firing assembly 90 is provided for detonating the detonator cord 86 and can take any number of suitable forms. By way of example, a rotor 91 is fixed on a shaft 92 by a pin 93. The shaft 92 is rotatably mounted in the block 88. The rotor 91 is provided with a hole 94 that has a percussion detonator 89 mounted therein which is adapted to be moved into alignment with the firing pin 101. Means is provided for rotating the rotor 91 and consists of a rotary solenoid 96 which is mounted on the shaft 92. The rotary solenoid is adapted to be controlled from a remote location, as for example, in the cockpit 21 of the aircraft 11. For this purpose, a suitable power supply such as a battery 97 is provided in the aircraft for energizing the rotary solenoid by closing of a switch 98 in the cockpit. When the rotary solenoid 96 is de-energized, the rotor 91 is in a safe position or in the position indicated in FIGURE 7A in which the percussion detonator 89 is out of alignment with the firing pin 101. When the rotary solenoid is energized, it shifts the rotor 91 to an armed position in which the percussion detonator 89 is in alignment with the firing pin 101.

A firing pin 101 is slidably mounted in a cover 102 carried by the block 88. The firing pin is provided with an operating knob 103. Means is mounted on the firing pin 101 for yieldably urging the firing pin 101 in a direction toward the percussion detonator 89 and consists of a spring 106 which has one end engaging the cover 102 and has the other end held in place on the pin 101 by a washer 107 and a pin 108. Means is provided for preventing the firing pin 101 from striking the percussion detonator 89 provided in the rotor 91 and consists of a retaining pin 111 extending through the firing pin 101 at right angles to the firing pin 101. The cover 102 is provided with slots 112 through which the retaining pin 111 is adapted to pass when the knob 103 is rotated to shift the firing pin 101 so that the retaining pin 111 is in alignment with the slots 112.

The switch 98 and the power supply 97 are also utilized for controlling similar apparatus for each of the other emergency egresses. In addition, for all emergency egresses which are not overlying the wings of the aircraft, additional means is provided to facilitate unloading of the passengers from the space 13 within the fuselage. This means can take any suitable form. By way of example, this can consist of an inflatable escape slide of 2 conventional constructions which when not in use as shown in FIGURE 2 is rolled up so that it underlies the seats 23 provided within the aircraft. Means is provided for automatically inflating the escape slide 16 in the event the emergency egress system is operated and consists of a tank 117 of compressed air which is also mounted beneath the floor 22 and is connected to an explosively operated valve 118 by a pipe 119. A pipe 121 connects the valve 118 to the escape slide 116. The explosively actuated valve 118 is provided with a detonator (not shown) which is connected by a detonating cord 122 to the T fitting 87 so that the cord is ignited at the same time that the detonating cord 86 is ignited.

Operation and use of the emergency egress system may now be briefly described as follows. Let it be assumed that the system has been incorporated in a vehicle 11 such as the aircraft shown in FIGURE 1 of the drawings. In one particular mode of operation, the emergency egress system could be primarily under the control of the pilot in the cockpit 21. After the passengers have been loaded into the plane through the conventional door 26 and the plane readied for takeoff with the passengers buckled in their seats, the pilot would operate the switch 98 to arm the emergency egress system by causing the rotary solenoids 96 to rotate the rotors 91 to the armed position shown in FIGURE 7B so that the firing pins 101 could pass through the holes 94 provided in the rotors to strike the percussion detonators 89.

In the event of a crash on takeoff, the passenger adjacent each of the emergency egresses 32 and 33 would merely unfasten his seat belt, stand up on the floor 22 and rotate and retract the knob 103 of the firing mechanism 90 to bring the pin 111 into alignment with the slots 112. The passenger would then release the knob 103 to permit the spring 106 to force the firing pin into engagement with the percussion detonator 89 to detonate the percussion detonator and to detonate the detonator cord 86 and the detonator 81. The detonation of the detonator 81 initiates the explosion of the linear shaped explosive charge 76. The explosion of the linear shaped explosive charge creates a concentrated jet which very rapidly cuts through the structural continuity plates 72 along the separation line 77 and at the same time propels the door 56 outwardly under the influence of the explosive force.

For the emergency egresses 32 which are not located over the wings 17 the explosively actuated valves 118 are also actuated to cause substantially simultaneous inflation of the escape slide 116 and to cause the same to distend from the opening in the manner shown in FIGURE 3. The passengers in the plane can then immediately make their exit from the aircraft through the emergency escape openings. With respect to the openings not over the wings, the passengers would slide down the slide 116 whereas the passengers exiting through the openings overlying the wings 17 would step out onto the wings and drop onto the ground and move rapidly away from the aircraft.

From the foregoing, it can be seen that in the event of an emergency as, for example, a crash landing on takeoff, the pasengers are in a position to rapidly actuate the emergency egresses which are provided in the aircraft and to escape very rapidly from the plane before there is danger of fire. Any number of such emergency egresses can be provided to ensure that all of the passengers within the plane can escape rapidly within the desired amount of time.

In the event that the plane is not damaged or can be readily repaired, the doors 56 which have been propelled from the plane can be readily replaced because they are not damaged by the operation of the emergency egress system. To replace the door, it is merely necessary to remove the separated portions of the structural continuity plates 72 which remain on the door frame 47 and on the door 56. Thereafter, the door 56 is placed in the door frame 47 and new structural continuity plates 72 are fastened in place by the screws 73 and 74. Prior to replacement of the door 56 the linear shaped charge 76, the blast absorbing member 78, the detonator 81, and the detonator cord 86 and the percussion detonator 89 would be replaced. However, all of this can be accomplished within a relatively short period of time, as for example, within an hour or so the plane can again be on its way.

The construction utilized in conjunction with the emergency egress system is such that relatively small explosive charges can be utilized for cutting the continuity plates 72 and for propelling the door 56 outwardly. The explosive charge is small enough so that there is substantially no smoke, fumes, or flames, or blast effects which would be evident within the interior of the passenger space in the aircraft. Thus, the passengers inside the aircraft would suffer no ill effects due to actuation of the emergency egress system in which the doors 56 are propelled outwardly from the aircraft. In fact, all the passengers would hear would be a slight noise at the time each door is propelled from the fuselage.

When a takeoff is completed successfully, the pilot after completion of the takeoff can open the switch 98 to de-energize the solenoids 96 and to return the rotors 91 to the safe positions, and thereafter prevent the passengers from operating the firing mechanisms 90. Thus, during the flight, the emergency egress system 31 would be placed in a safe condition so that it could not be operated by the passengers. During landing, the pilot again could close the switch 98 to place the emergency egress system in an armed condition so that in the event of a crash, the firing assemblies can be operated by the passengers to permit escape from the aircraft in the manner hereinbefore described. On safe landing of the aircraft, the pilot would again open the switch 98 to de-energize the solenoids 96 to return the rotors 91 to their safe positions.

It is apparent from the foregoing that there has been provided an emergency egress system which has many applications. It can be seen that it can be utilized on commercial and military aircraft to provide emergency egresses for passengers on the aircraft. Actuation of the system does not destroy the integrity of the aircraft. In addition, the aircraft can be readily placed back in operation within a relatively short period of time by reinstalling the doors which have been propelled therefrom. The construction is also such that much of the blast effect in the undesirable direction is absorbed by the rubber blast absorber so that there is no discomfort to the occupants of the aircraft.

Many different modes of operation can be utilized. For example, the emergency egress system can be placed exclusively under the control of the passengers. Alternatively, it can be placed solely at the discretion of the pilot merely by shifting the firing mechanism to the cockpit of the aircraft.

In addition to the use of the emergency egress system on aircraft, it can be readily seen that the system can also be utilized in conjunction with space vehicles to permit emergency escape from the capsule in the event of a dangerous situation occurring within the capsule, as for example, a fire.

The emergency escape system also has the advantage in that it is relatively inexpensive and that after once being operated it can be replaced by relatively unskilled personnel. The system does not affect the appearance of the aircraft nor does it affect its performance.

We claim:

1. In an emergency egress system, a vehicle having a wall-like structure enclosing a space adapted to be occupied by humans, said wall-like structure having spaced outer and inner walls and a framework mounted in said wall-like structure and having an opening therein of sufficient size to permit egress of humans from said space, a door disposed in said framework and closing said opening, said door having spaced inner and outer panels having generally the same spacing as the spacing between the outer and inner walls of the wall structure so that the outer wall and the outer panel of the door are substantially flush with each other and the inner wall and the inner panel are substantially flush with each other, said door facing generally in only one direction, securing means securing said door to said framework, linear shaped explosive charge means disposed adjacent to said securing means and means for detonating said linear shaped explosive charge means, said linear shaped explosive charge means being positioned so that the explosive effects therefrom are directed outwardly through said securing means whereby the securing means is separated and the door is propelled outwardly to open the emergency egress opening.

2. A system as in claim 1 together with blast-absorbing means adjacent to the linear shaped explosive charge means and being disposed to attenuate the blast effects from the linear shaped explosive charge means towards the space enclosed by the wall-like structure.

3. A system as in claim 1 wherein said means for detonating said linear shaped explosive charge means includes a firing mechanism mounted on the wall-like structure adjacent said door.

4. A system as in claim 1 wherein said securing means is in the form of plate-like means circumscribing said opening and said linear shaped explosive charge circumscribes said opening.

5. In an emergency egress system, an aircraft having a fuselage formed by a wall-like structure enclosing a space adapted to be occupied by humans, said aircraft also having a cockpit adapted to be occupied by the pilot of the aircraft, said wall-like structure having spaced outer and inner walls, a door frame mounted in the wall-like structure and having an opening therein of sufficient size to permit egress of humans from said space, a removable door disposed in the opening in the door frame and facing generally in only one direction, said door having spaced inner and outer wall panels having generally the same spacing as the spacing between the outer and inner walls of the wall-like structure so that the outer wall and the outer panel are substantially flush with each other and the inner wall and the inner panel are substantially flush with each other, plate-like means securing the door to the door frame and circumscribing said opening, said plate-like means, said outer wall of the wall-like structure and the outer panel of the door forming a substantially continuous surface, linear shaped explosive charge means disposed immediately behind said plate-like means circumscribing said opening, means for detonating the linear shaped explosive charge means to cause said plate-like means to be separated and to propel the door outwardly from the aircraft.

6. A system as in claim 5 wherein said means for detonating the linear shaped explosive charge means includes a firing mechanism having means capable of assuming safe and arm positions and means controlled in the cockpit of the aircraft for operating said means capable of assuming safe and arm positions.

7. A system as in claim 5 together with blast absorbing means circumscribing said opening disposed adjacent the linear shaped explosive charge means for absorbing shock waves travelling in the direction of the space within the aircraft.

8. A system as in claim 5 wherein the door frame is provided with a recess which circumscribes the opening and wherein said door has a flange adapted to seat in the said opening.

9. In an emergency escape system, an aircraft having a fuselage formed by a wall-like structure enclosing a space adapted to be occupied by humans, said aircraft also having a cockpit adapted to be occupied by the pilot of the aircraft, at least one emergency opening formed in the fuselage of the aircraft, a door frame mounted in the fuselage and circumscribing the opening formed in the aircraft, a removable door disposed in the opening in the door frame, plate-like means securing the door to the door frame, said plate-like means, said wall-like structure, and said door forming a substantially continuous surface, a linear shaped explosive charge disposed immediately behind said plate-like means and circumscribing said opening, means for detonating the linear shaped explosive charge to cause said plate-like means to be separated and to propel the door from the aircraft to provide an emergency opening for the aircraft, an escape slide mounted on the door frame and means actuated when the linear shaped explosive charge is initiated for placing the escape slide in an operative position.

10. A system as in claim 9 wherein said escape slide is of the inflatable type and wherein said means actuated when the linear shaped charge is initiated includes a supply of fluid under pressure, and explosively actuated valve means connecting said supply to said escape slide.

References Cited

UNITED STATES PATENTS

| | | | |
|---|---|---|---|
| 3,018,867 | 1/1962 | Heyniger | 244—137 X |
| 3,248,072 | 4/1966 | Schimmel | 244—1 |

FOREIGN PATENTS 1,064,348  8/1959  Germany.

FERGUS S. MIDDLETON, *Primary Examiner.*

THOMAS W. BUCKMAN, *Assistant Examiner.*

U.S. Cl. X.R.

244—119, 129